3,348,600
THIN-FILM-TYPE FLUID PROCESSING
APPARATUS
Leo J. Monty, Reading, Mass., assignor to Artisan Industries, Inc., Waltham, Mass., a corporation of Massachusetts
Filed Aug. 5, 1966, Ser. No. 570,462
10 Claims. (Cl. 159—6)

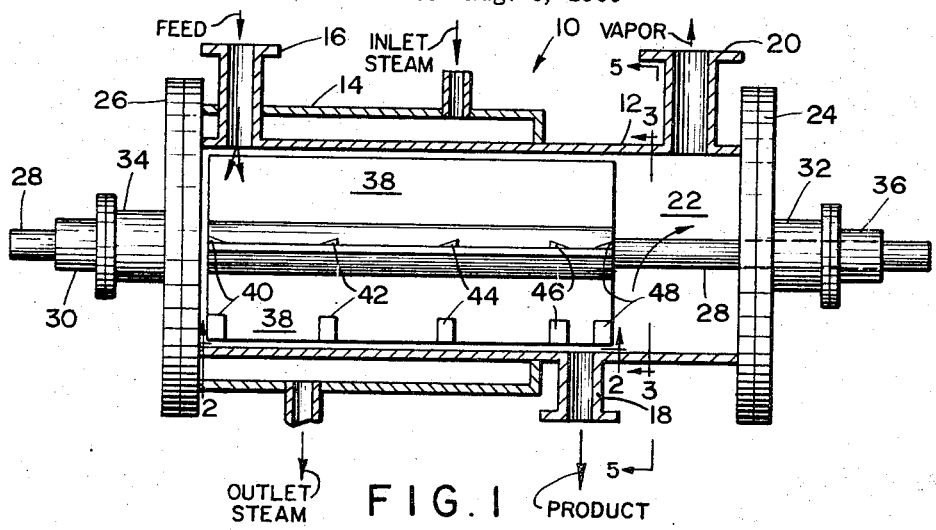
FIG. 1
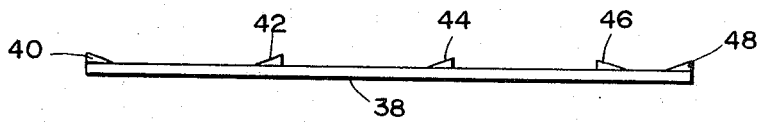
FIG. 2
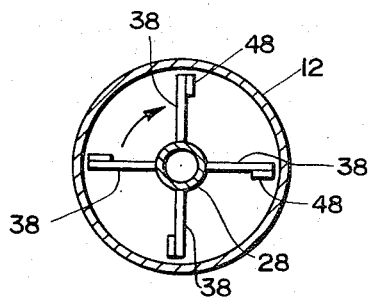
FIG. 3
FIG. 5
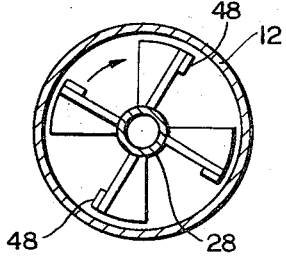
FIG. 4
INVENTOR.
LEO J. MONTY
BY
Richard P. Crowley
ATTORNEY 0# United States Patent Office 3,348,600
Patented Oct. 24, 1967

ABSTRACT OF THE DISCLOSURE

A thin-film-type device such as an evaporator with rotating rotor blades is described to control the flow of material through the device. The material to be processed is controlled by the use of raised projections such as individual wedges on the leading edges of the rotor blades. The surfaces of the projections are contoured to impart an axial vector component to the material. The raised projections may be employed on the rotor blades at or between the inlet and outlet of the evaporator to control the flow or residence time of the material in the evaporator or used adjacent the product outlet to direct material to the product outlet or employed between the product outlet and the vapor chamber to prevent liquid material from entering the vapor chamber.

---

My invention relates to a rotary, thin-film-type fluid processing apparatus for the treatment, reaction or processing of fluids such as liquids, suspensions, slurries, emulsions, solutions, molten solids and the like. In particular, my invention concerns a wiped or turbulent, thin film evaporator or fractionator and a means to control the residence time and/or flow of the fluid material processed through the evaporator.

In wiped or turbulent, thin film apparatus, particularly those horizontal or inclined axised evaporators, it is often desirable to control the flow, flow directions, and/or the residence time in the evaporator of the material to be processed. For example, with liquids of low viscosity a longer flow path or residence time is often desirable, while for liquids of higher viscosity a shorter flow path or residence time is typically required to reduce thermal degradation of the process material. In addition, liquid feed material may tend to accumulate in horizontal axised evaporators to the feed side of the inlet port, which subjects such material to a longer heating process. Further, particularly with inclined axised evaporators the liquid product tends to accumulate within the vapor chamber at or beyond the feed or outlet port of the evaporator. In the past, various means have been suggested to correct one or more of these problems. For example, conical or tapered evaporators having the feed port at the wide end of the evaporator have been disclosed for use in controlling the residence time of the process material. Variation in the residence time is accomplished by the balancing of the centrifugal force of the material in the evaporator, i.e., the tendency of the material to return to the inlet end by virtue of the tapered construction of the evaporator, with a pumping force used to introduce and force the material from the one to the other end of the evaporator (see U.S. Patent 2,927,634, issued Mar. 8, 1960). In addition, various dams on the evaporator body at the outlet end have been disclosed for use to increase the residence time of processing material (see U.S. Patent 3,228,453, issued Jan. 11, 1966) or to prevent material from entering the vapor chamber (see U.S. Patent 3,261,391, issued July 19, 1966).

It is an object of my invention to provide an improved thin film apparatus such as an evaporator characterized by means integrally formed with or secured to the rotor blades to control the flow and/or residence time of the material processed through the apparatus.

Another object of my invention is to provide a rotary, thin-film-type evaporator of a horizontal or substantially horizontally inclined type characterized by raised projections on the rotor blade adjacent either or both ends to inhibit or prevent the accumulation of product or feed material at either end of the evaporator.

A further object of my invention is to provide an improved rotary, thin-film-type evaporator characterized by wedge-shaped means on the rotor blades to aid or inhibit the flow of liquid material from the feed inlet to the product outlet of the evaporator.

Another object of my invention is to provide a rotary, thin-film-type evaporator characterized by means on the rotor blades at or about the product outlet to induce a change in flow direction and to aid in the discharge of the processed product from the evaporator and to prevent the product from entering or remaining in the vapor chamber.

These and other objects of my invention will be apparent to those persons skilled in the art from the accompanying drawing and the following description of my invention, wherein:

FIG. 1 is a schematic, longitudinal section through a cylindrical, rotary wiped, thin-film-type evaporator of my present invention;

FIG. 2 is a sectional end view on line 2—2 of one rotor blade of the apparatus of FIG. 1 showing wedges on the blade;

FIG. 3 is a sectional end view taken on line 3—3 of FIG. 1;

FIGS. 4a through h illustrate various types of projections which may be formed on the rotor blades in accordance with my invention; and FIG. 5 is a sectional end view taken on line 5—5 of FIG. 1 of a modified rotor blade construction for the apparatus of FIG. 1.

Briefly, my invention comprises in combination a closed chamber having an interior wall, a rotor within the chamber, means to rotate the rotor, generally radially and axially arranged rotor blades on the rotor extending from the axis into a close, thin film association with the interior wall of the chamber, a feed inlet, a product outlet, and means integrally formed with or secured to the rotor blades to control the flow and/or residence time of the material processed in the apparatus. The control means comprise protuberances or raised projections on one or more of the rotor blades generally with one edge of the projection substantially flush with the edge of the rotor blade tips and extending inwardly a predetermined, usually short distance toward the axis of the rotor. These raised projections are generally tapered to exert a forward directional force or tapered to retard or reverse the direction of the fillet of material formed on the interior wall of the chamber by such projections during operation of the rotor. These raised projections are typically attached to the leading side of the rotor blades to exert a desired directional force on the excess thin, circumferential film of liquid formed on the interior wall of the chamber.

The raised projections may extend inwardly toward the rotor axis for any length desired. Typically, in the smaller diameter evaporators the projections may extend across the entire rotor blade, while in larger diameter apparatus the projections may only need to be extended inwardly a short distance to obtain the desired results, for example, one-half inch to three inches. The raised projections need be extended inwardly only as far so as to exert a pressure on the liquid fillet of material formed at the head of the blade on the leading side. Generally, the projections are formed at substantially right angles to the axis of the rotor; however, if desired these projections may be placed at various angles to further retard, enhance, or control the progress and flow direction of the material through the evaporator. The height, shape and placement of the raised projections on the rotor blades may be varied as desired, or as hereafter shown. The number, type and location of the projections depend upon the material to be processed and the results desired. These raised projections may be formed integrally with the blade or be welded, bolted or otherwise secured onto the rotor blade. Typically, it is desired to position the projections similarly on all rotor blades in order to avoid an unbalance blade condition and excessive vibration during operation. However, processing evaporator conditions may require such projections to be placed in different positions, of different heights, and extend inwardly different lengths on the blades, and be of varying shape.

The height of the projections of each blade depends on the amount of fillet which is desired to be formed and the degree of retardation or flow enhancement desired. In general the projection approaches or is somewhat similar in thickness at its highest part to the thickness of the rotor blade used, e.g., 20 to 200 percent of the blade thickness, e.g., ¼ to ½ inch in height. My projections create a thin, narrow band or fillet of excess liquid material and by varying the shape of the material in contact with the raised projections, enhances or retards the progress of material through the evaporator. Such projections may in addition be used to control or direct the product flow to the feed or product outlet, reduce or eliminate the amount of liquid in the vapor outlet chamber, and eliminate the tendency of feed material to accumulate at either end of the evaporator. My invention will be described in particular as regards the operation of a horizontal axised, wiped, thin-film-type rotary evaporator, and its treatment of a low viscosity liquid feed material. However, as is recognized by those skilled in the art, my invention may be employed on any rotary, thin-film-type apparatus used for the treatment, reaction or processing of fluid materials.

Generally, my projections are characterized by one or more gradual or sharply sloping or tapered areas extending from the surface of the rotor blade to the desired height, usually over a short distance, for example, one-half to three inches. A wedge-shaped projection is often preferred as a relatively simple and versatile control means with the sloping area of the wedge generally or substantially aligned or parallel with the axis of the rotor. Of course, in some circumstances it may be advantageous to have the sloped areas cast inwardly or outwardly toward or from the interior wall. The sloped areas of the projection should face the flow direction of the feed material where it is desired to increase the residence time of the material to be processed.

In operation, the projection accumulates material behind its trailing edge creating a thin fillet or ribbon of material about the interior wall on rotation of the rotor blades. The material accumulates until it flows over the height of the projection (which occurs quite rapidly), the fillet formed being thinnest at the greatest height of the projection. The material on the sloping surface is then given a directional force as a vector component which is perpendicular to the slope. Where the slope faces the flow direction, the material is retarded in flow until the material is able to overcome the directional force and move over the projection. With the slope facing the flow direction a forward directional force is then imparted to the material. In operation, the effects of the directional forces may be observed by a continual, rather sudden series of spurts of fillets of material on the interior wall moving on either side of the projection depending on the direction of the sloped area.

In its preferred embodiment my invention will be described in connection with a horizontally axised, rotary, wiped, thin-film-type evaporator, and wherein the vapor is generated during the processing operation following the same direction as the product, i.e., concurrent with respect to the feed material, although my invention may also be employed in those evaporators wherein the flow of the vapor to the liquid feed is countercurrent, i.e., the vapor chamber is adjacent the feed end. One embodiment of the present invention is shown wherein a horizontal axised evaporator 10 comprises a closed cylindrical chamber 12 having interior walls and surrounded to a greater part of its length by a temperature control jacket 14 adapted for the introducing of a heating or cooling heat exchange fluid such as steam, cold water or the like. The chamber 12 is characterized by a feed inlet 16, a product outlet 18 at the opposite end thereof, and a vapor outlet 20, which vapor outlet extends from a vapor chamber 22 adjacent the product end of the evaporator. Closing heads 24 and 26 are secured to either end of the chamber 12 and support a horizontally inclined central axised tube-like rotor 28, which extends from the one to the other end of the chamber 12 and through the vapor chamber 22. The rotor 28 is driven by a motor or other means (not shown), and generally extends outwardly from each end of the closing heads. The rotor 28 extends through suitable bearings 34 and 32 and seals or packing 30 and 36 are disposed at either end of the evaporator. The rotor shaft 28 is mounted for axial displacement or adjustment by any desired or convenient means, which may include a series of grooves or threads which locate the rotor shaft with respect to the end plates 24 and 26. Extending axially outwardly from the rotor shaft 28 are a plurality of radial rotor blades 38, the blade tips of which extend into a small, but generally uniform, closely spaced relationship with respect to the interior wall of the chamber 12, so that upon rotation of the rotor shaft 28 the rotor blades 38 provide a thin, wiped or turbulent film of the material on the interior walls of the chamber 12.

Integrally formed with or mounted or secured on each rotor blade 38 are a series of raised, wedge projections 40, 42, 44, 46 and 48. The height of the wedges may be varied depending upon process conditions. However, heights of about the width of the rotor blades or less are often satisfactory. The tapered slope of the wedges may also vary depending upon the residence time desired for the material to be processed. Typically, the slope may vary from about 15° to 60°, e.g., 30° or 45°. In the evaporator illustrated projections 40, 42, 44 and 46 are so arranged that 42 and 44 increase the residence time of the material, while 40, 46 and 48 are used to control the directional flow of the material.

In operation a liquid such as a low viscosity liquid to be processed through the evaporator 10 is introduced into feed port 16 by a pump, gravity or under vacuum with the relatively non-volatile product material withdrawn through product outlet 18, and the vaporized material withdrawn through vapor outlet 20. Of course, if desired other vapor, product outlets, and feed inlets may be used. The rotor shaft 28 and rotor blades 38 are rotated at high speed during the processing to form a thin film of the feed material against the interior wall of the chamber 12 with a heat exchange fluid such as steam introduced into the heat jacket 14, whereby the thin film on the interior wall is placed in heat exchange relationship with the steam in the heating jacket to affect an evaporation of the relatively volatile component of the feed material as the material proceeds through the evaporator. As rotor blades rotate, thin fillets extend around the interior wall of the chamber 12 where the raised projections are located on the rotor blade 38. During operation wedge 40 prevents feed material from moving and accumulating on the interior wall of the closing head 26, or on the interior wall of chamber 12 to the left of the feed port 16, and its forward slope gives a directional force to the feed material away from the wall of the head 26 to the right, i.e., in the process flow direction thereby forcing the feed material to move toward the direction of the product outlet 18. The amount and nature of the directional force will, of course, depend upon the extent of the sloping edge of the wedge 40. Thus, as material builds up or tends to build up to the left of wedge 40, it is formed into a thin film and directed toward the product outlet 18 of the evaporator 10.

Projections 42 and 44 retard the process flow of the material through the evaporator (and increase the residence time) by permitting the excess material removed from the wall to form a thin fillet along the edge of projections 42 and 44, and as the fillet builds up and excess material is cast on the forward slope of the wedges 42 and 44, it is propelled backward by virtue of the sloping face area of the wedges. Projections 46 and 48 are placed in the area of the product outlet 18, for example, as shown just before and after the product outlet 18, respectively. Projection 46 retards the movement of material, but is primarily used to give directional force to the material toward the product outlet 18. This, then inhibits material already processed from moving over and past the outlet by virtue of the rotating blades. If desired a portion of the blade may be cut out where the blade extends over the outlet 18 to also aid material from being pushed past the outlet 18. Projection 48 is located and its slope placed to prevent the liquid material from entering the vapor chamber 22, and has its forward edge tapered in a direction opposite to that of projection 46 in order to propel any material that has a tendency to pass by the product outlet 18 back toward the product outlet 18. Thus, in effect projections 48 and 40 act as directional dams on the rotor blade. For example, projection 48 may also be a rectangular block where a damming action is primarily desired, or, as shown, may employ a wedge-shaped projection to act both as a dam and for more directional control of the material toward the outlet 18.

FIG. 3 is a sectional end view of the rotor and rotor blades showing the projection 48 as located at the end edge and on the tip of all blades 38. Although my control means may be placed on either or both sides of the rotor blades, it is preferred that the projections be placed on the leading side and edge of the rotor blades, as shown. My flow control means provide particular versatility where the evaporator has the rotor axially adjustable by means such as shown in FIG. 7 of U.S. Patent 2,927,634 so that movement of the rotary blades will position the wedges anywhere within the feed or product outlet area. For example, movement of the rotor blade to the right to place projection 46 over, for example, in the middle of the product outlet 18 permits the material processed through the evaporator to move readily and be discharged to the outlet.

In the event that liquid does accumulate in the vapor chamber through entrainment in the vapor or where the evaporator is operated at an inclined angle, then projection 48 tends to pick up and return liquid material in the vapor chamber toward the product outlet 18. For example, where a large body of liquid may tend to accumulate in the vapor chamber 22 rotation of the rotor blades with projection 48, where at least a part of the rotor blade 38 extends into the liquid, creates an upward force, like a pump, overcoming the gravity force of the evaporator inclination, and directs the accumulated liquid material toward the product outlet 18. Projection 48 may also be used to change the direction of flow of the material at the outlet from horizontal or substantially horizontal to downward and toward the product outlet 18. For example, by employing a wedge with the sloping face undercut and downwardly disposed toward the product outlet 18.

Various projections which may be employed are illustrated in FIG. 4. Assuming the flow of a liquid feed material from the left to the right in FIG. 4, the wedges of FIG. 5a and b would tend to retard flow, and, thereby increase the residence time in the evaporator of, say a low viscosity liquid, since the projections would create a vector component and force perpendicular to the slope of the wedge, and, therefore, back toward the feed port. The projections of 4c and d would tend to move the material forward, while combined effects may be obtained by the projection of FIG. 4e and g. The rectangular wedge of FIG. 4f is often useful as is FIG. 4e in the area of the feed or product ports, i.e., primarily to create a damming action and to direct material away from the feed inlet 16 or toward the product outlet 18. FIG. 4g illustrates a rounded projection which may be used, for example, when the processing feed material is very viscose, and may tend to accumulate against a projection with sharp edges. The projections of FIG. 4g may be obtained by forming a rotor blade on either or both sides as an entirely corrugated blade or where just the blade tip area is corrugated.

FIG. 5 illustrates an end view of another embodiment wherein my projections, as shown in FIG. 1, are illustrated on rotor blades having a leading end. FIG. 1 has been described with rotor blades which extend axially from the rotor and which blades are straight, longitudinal blades from the one to the other end of the rotor when viewed axially. However, one or more helical-type rotor blades may be employed, which blades permit flow control over the material to be processed, depending upon the direction and extent of the helical twist. Rotor blades having a clockwise twist as illustrated in FIG. 5 may be used to enhance the flow of viscous material. FIG. 5 shows a clockwise helical twist to a rotor blade when viewed along the line 5—5 of FIG. 1 with the end of the blade at the product outlet end leading or extending clockwise about the axis of rotation with respect to the end of the blade at the feed inlet end. A reverse twist from the direction of rotation as shown in FIG. 5 would retard the flow of less viscous material. My projections may be used with such helical blades to provide an additional flow control means. Typically, my helical rotor blades would extend axially, but not be longitudinally aligned with the rotor axis, but would be characterized, for example, by one end being ahead or behind the other by a predetermined amount. Such rotor blades would be gradually twisted so that one end would be offset, for example, 5° to 45° from the other end. The twisting of the blade introduces an axial vector component to the flow of the material through the evaporator.

In mechanically aided film type evaporators the rotor blade tips or edges typically do not touch the interior wall of the chamber and, thus, create a turbulent film of material. However, if the material being processed or during processing becomes very viscous the thin film on the interior wall is not agitated or made turbulent by the rotating blade tips. In such cases the capacity to put heat into the material is reduced so that recovery from this condition is attempted by increasing the rotor speed to increase centrifugal force which results in more plowing action and agitation of the thin film. For the purposes of this application the term "thin film" is meant to include both cases wherein a wiped or turbulent thin film is created by rotating rotor blades. The term "generally radially and coaxially arranged from the rotor" in reference to the rotor blades is meant to include tapered, rectilineal and helical-type rotor blades.

My invention has been described in particular in connection with the cylindrical type, horizontal axised evaporator. However, my means to control the material in such apparatus may be profitably employed in tapered or conical-shaped, thin film evaporators where such means may be used in conjunction with or in addition to the tapering of the internal chamber walls to retard or enhance the flow of material through the evaporator.

What I claim is:
1. A fluid processing apparatus of the rotary, thin film type which apparatus comprises in combination:
(a) a closed chamber characterized by an interior wall defining a surface of revolution;
(b) a rotor within the chamber;
(c) means to rotate the rotor;

(d) rotor blades secured to the rotor for rotation therewith, the blades generally radially and coaxially arranged from the rotor, and extending into a close non-contacting relationship with the interior wall of the chamber to form a small space between the edge of the blades and the interior wall during rotation of the rotor blades;

(e) an inlet means at one end in the chamber for the introduction of material to be processed;

(f) outlet means in the chamber axially spaced apart from the inlet means for the removal of processed material from the chamber; and (g) means to control the flow of the material in the apparatus, which means includes at least one raised projection, the projection lying entirely on the leading or advancing face of the blades with reference to the direction of rotation of the rotor blades, the projection being substantially flush with the peripheral edge of the blade and extending radially inwardly a predetermined distance, the projection having its surface contoured to impart an axial vector component to the material being processed.

2. The apparatus of claim 1 wherein the projection extends inwardly along the rotor blade surface a predetermined short distance at substantially a right angle to the axis of the rotor.

3. The apparatus of claim 1 wherein the raised projection is characterized by a tapered wedge, the tapered surface extending generally parallel to the direction of the axis of the rotor.

4. The apparatus of claim 1 wherein the rotor blade extends axially beyond and downstream of the outlet means and a raised projection on the rotor blade at its periphery being located adjacent but downstream of the outlet and its surface being shaped to provide a countercurrent axial component to prevent the flow of material past the outlet.

5. The apparatus of claim 4 which includes means to adjust the position of the rotor along its axis so that the location of the projection adjacent the outlet area may be varied.

6. The apparatus of claim 1 wherein each rotor blade includes a plurality of wedge projections, the projections extending inwardly a short distance at substantially right angles to the axis of the rotor, and the tapered surface of each projection being generally parallel with the axis of the rotor.

7. The apparatus of claim 1 wherein said closed chamber includes a vapor chamber and wherein one of said raised projections on the rotor blade is located on the rotor blade adjacent the entrance to the vapor chamber, the projection preventing the flow of liquid material axially beyond the rotor blades into the vapor chamber.

8. The apparatus of claim 1 wherein one or more of the rotor blades is characterized by a helical twist when viewed along the axis of the rotor as the blade extends from the one to the other end of the rotor, whereby flow control of the material is attained by the extent and direction of such blade twist.

9. An evaporator of the wiped, thin film type which evaporator comprises in combination:

(a) a substantially horizontally disposed closed chamber characterized by an interior wall defining a surface of revolution;

(b) a temperature control jacket externally surrounding the closed chamber;

(c) a vapor chamber adjacent one end of the closed chamber;

(d) a rotor within the closed chamber;

(e) means to rotate the rotor;

(f) a plurality of rotor blades secured to the rotor for rotation therewith, the blades generally radially and coaxially arranged from the rotor and extending into a close non-contacting relationship with the interior wall of the chamber to form a small, permanent space between the peripheral edges of the blades and the interior wall at all times during rotation of the rotor blades;

(g) an inlet in the closed chamber and at one end thereof for the introduction of liquid material to be processed;

(h) an outlet in the closed chamber at the other end thereof for the removal of processed liquid from the chamber;

(i) an outlet in the vapor chamber for the removal of vapor; and (j) means to control the flow of materials in the evaporator, which means includes at least one raised projection on each of at least a pair of rotor blades, the projection lying entirely on the leading or advancing face of the blades with reference to the direction of rotation of each rotor blade, the projection being substantially flush with the peripheral edge of the blade and extending inwardly a short distance substantially perpendicular to the rotor axis, the surface of the projection contoured to impart an axial vector component to the material being processed.

10. The apparatus of claim 9 which includes a pair of first and second raised projections located on either side of the outlet, the one projection shaped and of sufficient height to inhibit the flow of liquid material into the vapor chamber, and the other projection shaped to aid the axial flow of the material from the apparatus into the outlet.

References Cited

UNITED STATES PATENTS

| | | | |
|---|---|---|---|
| 1,844,643 | 2/1932 | Yarmett | 196—128 |
| 2,890,155 | 6/1959 | Bueche | 202—236 |
| 2,927,634 | 3/1960 | Gudheim | 159—6 |
| 2,993,842 | 7/1961 | Smith | 202—236 |
| 3,020,211 | 2/1962 | Smith | 202—236 |
| 3,253,643 | 5/1966 | Gudheim | 159—6 |

NORMAN YUDKOFF, *Primary Examiner.*

J. SOFER, *Assistant Examiner.*